US012254560B2

(12) United States Patent
Agrawal et al.

(10) Patent No.: US 12,254,560 B2
(45) Date of Patent: Mar. 18, 2025

(54) GENERATIVE ADVERSARIAL NETWORK BASED IDENTIFICATION OF INDUCED DEFORMATION IN THREE-DIMENSIONAL OBJECT

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/055,431

(22) Filed: Nov. 15, 2022

(65) Prior Publication Data
US 2024/0161386 A1 May 16, 2024

(51) Int. Cl.
*G06T 15/10* (2011.01)
(52) U.S. Cl.
CPC .... *G06T 15/10* (2013.01); *G06T 2207/20081* (2013.01); *G06T 2207/20084* (2013.01)
(58) Field of Classification Search
CPC ......... G06T 17/00; G06T 19/20; G06T 15/00; G06T 15/10; G06T 2207/20081;
(Continued)

(56) References Cited

U.S. PATENT DOCUMENTS

2021/0082172 A1\* 3/2021 Liu ................. G06N 3/045
2021/0295020 A1\* 9/2021 Cao ................ G06V 10/764
(Continued)

FOREIGN PATENT DOCUMENTS

CN 110084845 A 8/2019
CN 110489707 A 11/2019
(Continued)

OTHER PUBLICATIONS

Author Unknown, "A Beginner's Guide to Generative Adversarial Networks (GANs)," Wiki Pathmind, Accessed: Jul. 26, 2022, https://wiki.pathmind.com/generative-adversarial-network-gan, 29 pages.
(Continued)

*Primary Examiner* — Hau H Nguyen
(74) *Attorney, Agent, or Firm* — Anthony M. Pallone

(57) ABSTRACT

According to one embodiment, a method, computer system, and computer program product for identifying induced deformation of a 3D object is provided. The embodiment may include receiving an unaltered three-dimensional (3D) rendering of an object and attribute information of the object. The embodiment may include identifying one or more influencing factors of forecasted local deformation of one or more portions of the 3D rendering based on the attribute information. The embodiment may include creating, via a generative adversarial network (GAN), a 3D rendering of the object showing the forecasted local deformation. The embodiment may include identifying induced deformation of one or more other portions of the 3D rendering caused by the forecasted local deformation. The embodiment may include creating, via the GAN, a 3D rendering of the object showing the identified induced deformation.

18 Claims, 2 Drawing Sheets

(58) Field of Classification Search
CPC ........... G06T 2207/20084; G06F 30/27; G06F 2119/14; G06N 3/0475; G06N 3/094
See application file for complete search history.

(56) References Cited

U.S. PATENT DOCUMENTS

| | | | |
|---|---|---|---|
| 2022/0237869 A1* | 7/2022 | Takeda | G06N 3/08 |
| 2024/0046567 A1* | 2/2024 | Chaudhuri | G06V 10/7553 |

FOREIGN PATENT DOCUMENTS

| | | |
|---|---|---|
| CN | 111091624 A | 5/2020 |
| CN | 113269872 A | 8/2021 |
| CN | 112598649 B | 4/2022 |
| CN | 108537743 B | 5/2022 |
| GB | 2581524 A | 8/2020 |
| WO | 2021247662 A1 | 12/2021 |
| WO | 2021248473 A1 | 12/2021 |

OTHER PUBLICATIONS

Berenson, "Manipulation of Deformable Objects Without Modeling and Simulating Deformation," 2013 IEEE/RSJ International Conference on Intelligent Robots and Systems (IROS), Nov. 3-7, 2013, https://ieeexplore.ieee.org/document/6697007, pp. 4525-4532.

Guo et al., "Deformation Control of a Deformable Object Based on Visual and Tactile Feedback" Cornell University, arXiv:2105.14429v1 [cs.RO] May 30, 2021, https://arxiv.org/abs/2105.14429, 7 pages.

IBM Technology, "What are GANs (Generative Adversarial Networks)?," YouTube, Nov. 11, 2021, https://www.youtube.com/watch?v=TpMlssRdhco, 4 pages.

IBM, "Generative Adversarial Networks | IBM," IBM MediaCenter, Accessed: Aug. 11, 2022, https://mediacenter.ibm.com/media/Generative+Adversarial+Networks+%7C+IBM/1_l6y6qpof, 15 pages.

IBM, "IBM Engineering Requirements Management DOORS Next," IBM.com, Accessed: Aug. 22, 2022, https://www.ibm.com/products/requirements-management-doors-next, 3 pages.

IBM, "IBM Engineering Systems Design Rhapsody," IBM.com, Accessed: Aug. 11, 2022, https://www.ibm.com/products/systems-design-rhapsody, 6 pages.

IBM, "Round-the-clock accurate weather reports help VTV keep citizens informed," IBM.com, Accessed: Aug. 11, 2022, https://www.ibm.com/weather/industries/broadcast-media, 11 pages.

IBM, "Weather Company Max Solution adds 3D and high-resolution city models, international lightning coverage, data packages, and traffic and road data," IBM.com, IBM United States Software Announcement 220-199, May 26, 2020, https://www.ibm.com/common/ssi/ShowDoc.wss?docURL=/common/ssi/rep_ca/9/897/ENUS220-199/index.html&request_locale=en, 10 pages.

Lei, "Generative Adversarial Network technology: AI goes mainstream," IBM, Sep. 17, 2019, https://www.ibm.com/blogs/systems/generative-adversarial-network-technology-ai-goes-mainstream/, 7 pages.

Meet Shah, "3D GAN—3D Generative Adversarial Networks for Volume Generation and Classification," Meetshah.dev, Apr. 1, 2017, https://www.meetshah.dev/gan/deep-learning/tensorflow/visdom/2017/04/01/3d-generative-adverserial-networks-for-volume-classification-and-generation.html, 4 pages.

Provatas, "Predicting new materials and processes: the power of computer simulations" Research Features, Apr. 5, 2018, https://researchfeatures.com/predicting-new-materials/, 3 pages.

Rawat et al., "Researchers develop defenses against deep learning hack attacks," IBM, Aug. 5, 2021, https://research.ibm.com/blog/defend-deep-learning-hacks, 9 pages.

Rawat et al., "The Devil is in the GAN: Defending Deep Generative Models Against Backdoor Attacks" arXiv:2108.01644v1 [cs.CR] Aug. 3, 2021, https://arxiv.org/abs/2108.01644, 33 pages.

University of California, "New method makes better predictions of material properties using low quality data" Tech Xplore, Jan. 14, 2021, https://techxplore.com/news/2021-01-method-material-properties-quality.html, 5 pages.

\* cited by examiner

GENERATIVE ADVERSARIAL NETWORK BASED IDENTIFICATION OF INDUCED DEFORMATION IN THREE-DIMENSIONAL OBJECT

BACKGROUND

The present invention relates generally to the field of computing, and more particularly to three-dimensional (3D) modeling using a generative adversarial network.

A generative adversarial network (GAN) is a class of unsupervised machine learning frameworks in which two neural networks (i.e., a generative network and a discriminative network) compete with each other to generate new, synthetic instances of data that may pass for real data. More specifically, the generative network constructs results (i.e., outputs) from input and sends them to the discriminative network for evaluation. The goal of the generative network is to artificially generate outputs that may be mistaken for real data. The goal of the discriminative network is to identify which outputs, received from the generative network, have been artificially created. As the feedback loop between the adversarial networks continues, the generative network will begin to produce higher quality output and the discriminative network will become better at identifying data that has been artificially created. GANs are widely used in image generation, video generation, and voice generation. When used for image generation, the generative network is typically a deconvolutional neural network, and the discriminative network is a convolutional neural network.

SUMMARY

According to one embodiment, a method, computer system, and computer program product for identifying induced deformation of a 3D object is provided. The embodiment may include receiving an unaltered three-dimensional (3D) rendering of an object and attribute information of the object. The embodiment may include identifying one or more influencing factors of forecasted local deformation of one or more portions of the 3D rendering based on the attribute information. The embodiment may include creating, via a generative adversarial network (GAN), a 3D rendering of the object showing the forecasted local deformation. The embodiment may include identifying induced deformation of one or more other portions of the 3D rendering caused by the forecasted local deformation. The embodiment may include creating, via the GAN, a 3D rendering of the object showing the identified induced deformation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
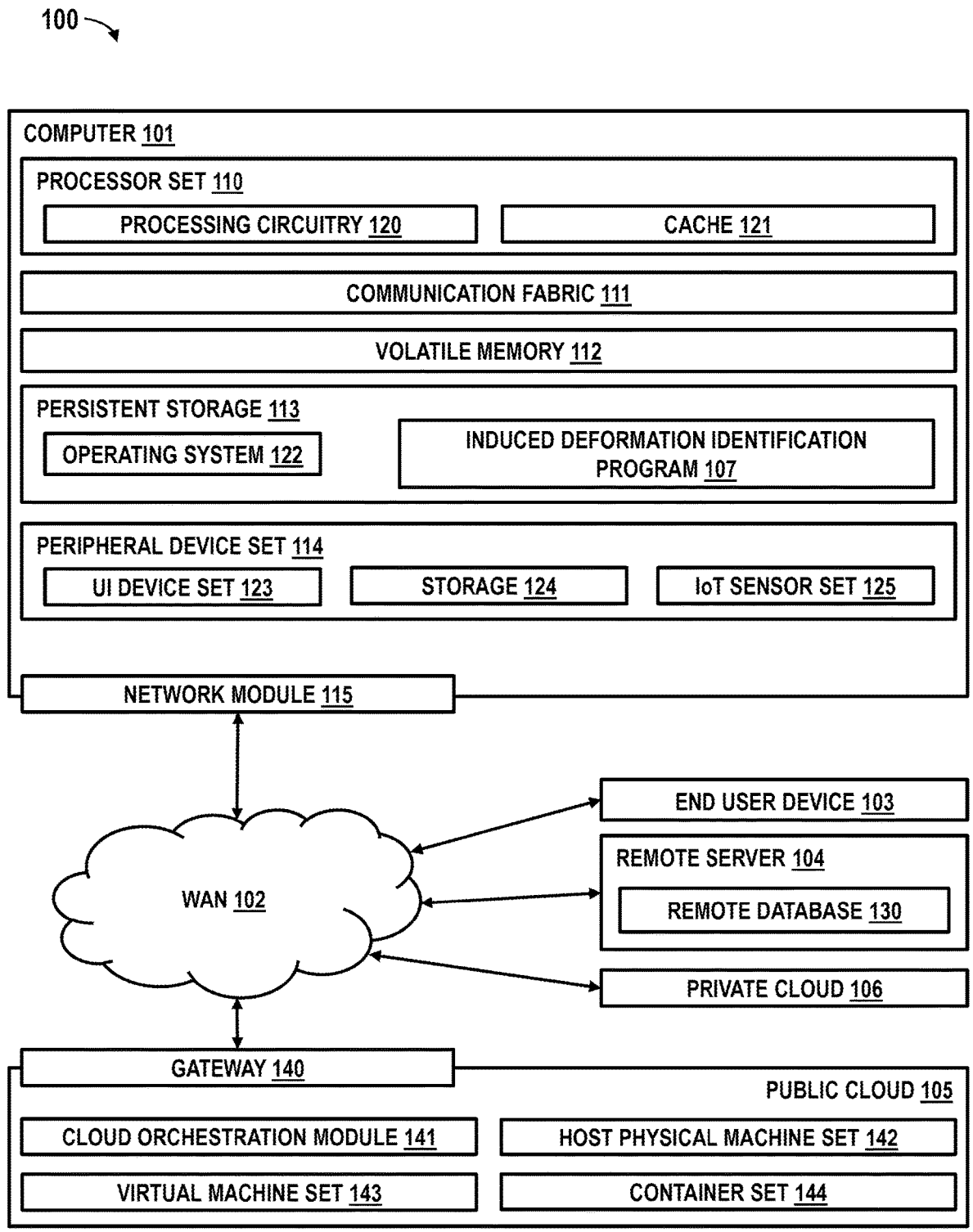
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to three-dimensional (3D) modeling using a generative adversarial network (GAN). The following described exemplary embodiments provide a system, method, and program product to, among other things, identify, using a GAN, induced deformation of a 3D model of an object. Therefore, the present embodiment has the capacity to improve the technical field of 3D modeling using a GAN by dynamically predicting induced deformation within a 3D model of an object based on identified local deformation of one or more portions of the 3D model which result from one or more external factors, and evaluating, using the 3D model, the impact of changes to design and/or material composition of the object on its predicted deformation, thus providing a user early warning of deformation causing external factors and enabling the user to mitigate predicted deformation of the object.

As previously described, a GAN is a class of unsupervised machine learning frameworks in which two neural networks (i.e., a generative network and a discriminative network) compete with each other to generate new, synthetic instances of data that may pass for real data. More specifically, the generative network constructs results (i.e., outputs) from input and sends them to the discriminative network for evaluation. The goal of the generative network is to artificially generate outputs that may be mistaken for real data. The goal of the discriminative network is to identify which outputs, received from the generative network, have been artificially created. As the feedback loop between the adversarial networks continues, the generative network will begin to produce higher quality output and the discriminative network will become better at identifying data that has been artificially created. GANs are widely used in image generation, video generation, and voice generation. When used for image generation, the generative network is typically a deconvolutional neural network, and the discriminative network is a convolutional neural network.

In the context of image generation, a GAN may be used for enhancing an image, as well as for deforming an image, based on a user's interaction or need. Moreover, known implementations of a 3D GAN architecture may transform a latent representation of a two-dimensional image (i.e., a vector of numbers representing all of the pixels in the image) into a rendered 3D model. Such an architecture may be used to reconstruct 3D models of objects from images and to generate new objects as 3D point clouds. Implementation of a 3D GAN may be useful as a tool for object evaluation within several industries including, but not limited to, machine part manufacturing, architectural design, and weather evaluation. For example, a machine part having a rear side exposed to the elements (e.g., sunlight, moisture) when used outdoors may be rendered as a 3D object. A 3D GAN model forecast of the 3D object may be generated to simulate and evaluate potential local deformation of the machine part as the rear side heats up due to prolonged exposure to sunlight. Furthermore, the 3D GAN model may also be used to simulate and evaluate potential induced deformation of other areas of the machine part, or any adjoining parts, resulting from the local deformation. As another example, an architectural design having a large atrium in the center may be rendered as a 3D object. A 3D GAN model forecast of the 3D object may be generated to simulate and evaluate potential local deformation of the atrium roof and walls due to the weight of people and furniture inside. Furthermore, the 3D GAN model may also be used to simulate and evaluate potential induced deformation of other areas of the architectural design resulting from the local deformation.

In the above examples, if any portion of a 3D object is modified (e.g., shrinks, expands, changes its shape, dimensions, etc.) in a non-uniform or uniform manner, then the entire 3D object may be impacted. For instance, the shape or dimension(s) of the entire 3D object may also be changed, or if not changed, may create stress on one or more other areas of the 3D object, and/or on one or more adjoining objects, based on attributes of a selected material composition simulated by the 3D object. It may therefore be imperative to have a system in place to dynamically render and compare multiple 3D GAN generated 3D objects which model an original shape of an object, a shape of the original object with forecasted local deformation, and a shape of the original object with the forecasted local deformation and forecasted induced deformation resulting from the local deformation. Thus, embodiments of the present invention may be advantageous to, among other things, utilize a 3D GAN to: identify one or more external or internal factors which may influence local deformation of an object; render multiple 3D representations of an object; identify and model a forecasted local deformation of a rendered 3D representation of an object due to one or more influencing factors; identify and model forecasted induced deformation one or more areas of a rendered 3D representation of an object resulting from an identified local deformation; evaluate design and material selection of an object represented by a rendered 3D object based on an identified overall change in shape/dimensions of the rendered 3D object; and recommend an appropriate material for an object in order to mitigate deformation or promote desired or expected deformation. The present invention does not require that all advantages need to be incorporated into every embodiment of the invention.

According to at least one embodiment, a 3D rendering of an object having an original shape may be received or created. The 3D rendering may include attribute information such as material composition, shape, dimensions, density, and other physical properties. Predicted local deformation of one or more portions of the 3D rendering may be identified based on evaluation of usage parameters (i.e., influencing factors) of the object and the attribute information of the 3D rendering. According to at least one other embodiment, the predicted local deformation may be identified based on historical learning and reference to a deformation and materials knowledge corpus. According to at least one embodiment, a 3D GAN may be used to generate another 3D rendering of the object showing the original shape of the object altered with the predicted local deformation. The generated 3D rendering with the predicted local deformation may be analyzed and used as input to identify induced deformation of one or more other portions of the 3D rendering which may derive from the predicted local deformation. The 3D GAN may be used to generate yet another 3D rendering of the object showing the original shape of the object altered with the identified induced deformation. According to at least one embodiment, the 3D rendering of the object showing its original shape, the 3D rendering of the object showing the original shape altered with the predicted local deformation, and the 3D rendering of the object showing the original shape altered with the identified induced deformation may be overlaid and displayed to a user via a graphical user interface (GUI). Furthermore, object design and material composition recommendations which mitigate object deformation may be presented to the user based on compare processing of the displayed 3D renderings within the GUI.

According to at least one other embodiment, based on design and material composition recommendations, instances of an object may be 3D-printed in various materials and their respective usage patterns may be compared over time. Information regarding effects on the 3D-printed objects resulting from their respective usage patterns may be gathered and used to further machine-learning of future 3D GAN usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to utilize a GAN to generate a 3D rendering of an object having a shape altered by forecasted local deformation of one or more portions of the object and, accordingly, identify, via another 3D rendering, forecasted induced deformation, derived from the forecasted local deformation, of one or more other portions of the object.

Referring to FIG. 1, an exemplary computing environment 100 is depicted, according to at least one embodiment. Computing environment 100 contains an example of an environment for the execution of at least some of the computer code involved in performing the inventive methods, such as induced deformation identification (IDI) program 107. In addition to IDI program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and IDI program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in IDI program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in IDI program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, EUD 103 may additionally be a wireless charger device now known or to be developed in the future that is capable of transmitting power wirelessly to one or more power-consuming electric devices in accordance with any government regulations regarding wireless power output. For example, EUD 103 may be any known IR wireless charger that transmits power to computer 101 wirelessly through power beaming or beam-formed signals. As another example, EUD 103 may be any known RF wireless charger capable of providing radiated energy to computer 101. Although depicted as a single device, computing environment 100 may include a plurality of EUDs 103.

The IDI program 107 may be a program capable of identifying one or more influencing factors which may cause a local deformation of shape in one or more areas of an object based on properties of the object, utilizing a GAN to generate a 3D rendering of the object with a shape depicting a forecasted local deformation in one or more areas of the object due to at least one identified influencing factor, identifying induced deformation of shape in one or more other areas of the object which may result from the forecasted local deformation, utilizing a GAN to generate a 3D rendering of the object with a shape depicting the identified induced deformation, comparing effects of identified influencing factors on one or more generated 3D renderings via a GUI, and recommending design and/or material composition selections which may mitigate deformation of the object or may promote expected or desired deformation of the object. In at least one embodiment, IDI program 107 may require a user to opt-in to system usage upon opening or installation of IDI program 107. Notwithstanding depiction in computer 101, IDI program 107 may be stored in and/or executed by, individually or in any combination, end user device 103, remote server 104, public cloud 105, and private cloud 106 so that functionality may be separated among the devices. The induced deformation identification method is explained in further detail below with respect to FIG. 2.

Figure 2:
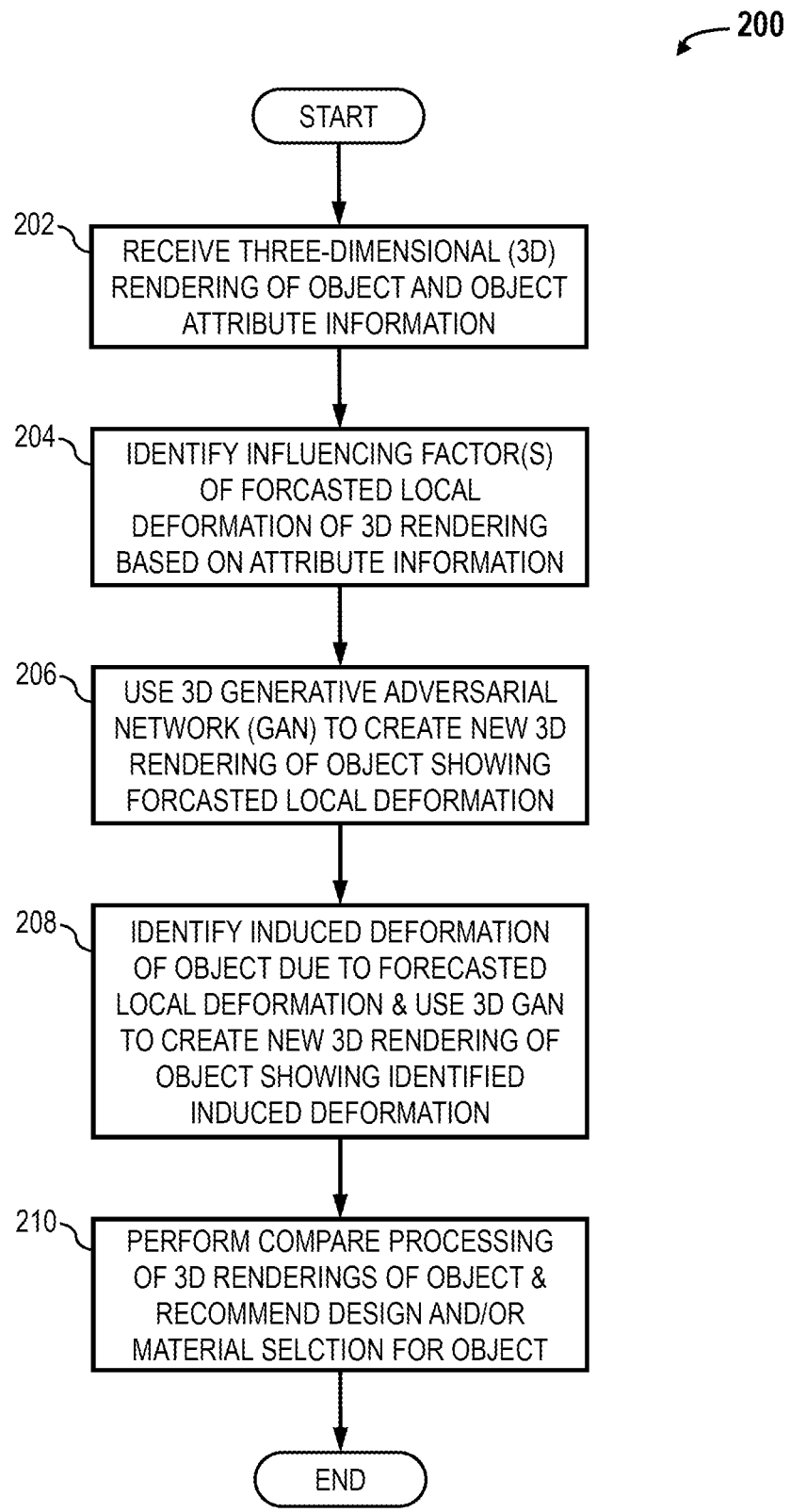
FIG. 2 illustrates an operational flowchart for identifying induced deformation of a 3D object based on one or more areas of forecasted local deformation of the 3D object via an induced deformation identification process according to at least one embodiment.

Referring now to FIG. 2, an operational flowchart for identifying induced deformation of a 3D object based on one or more areas of forecasted local deformation of the 3D object via an induced deformation identification process 200 is depicted according to at least one embodiment. At 202, IDI program 107 receives an unaltered 3D rendering of an object showing an original shape. For example, IDI program 107 may receive a 3D rendering of a machine part having an original shape from a computer aided drafting (CAD) software application. Also at 202, IDI program 107 receives attribute information (i.e., metadata) of the 3D rendering of the object. For example, IDI program 107 may receive attribute information of the 3D rendering of the machine part. The attribute information may include information of physical properties of the machine part (e.g., original shape/ dimensions, material composition selection with corresponding density and expansion coefficient) as well as information of usage parameters of the machine part (e.g., placement of machine part within a larger assembly, identification of adjoining parts, environmental conditions the machine part will be subjected to (moisture, humidity, air, temperature, etc.), and forces (pressure, etc.) affecting the machine part). According to at least one embodiment, IDI program 107 may receive attribute information, such as described above, of a 3D rendering of an object via reference to a deformation and materials knowledge corpus (e.g., remote database 130). According to at least one other embodiment, where a 3D rendering of an object showing an original shape is not received from a CAD software application, IDI program 107 may create a 3D model of an existing physical object by scanning it using known 3D scanning technology. Furthermore, IDI program 107 may analyze the created 3D model to derive attribute information, such as described in the above example, and may also store derived attribute information within the deformation and materials knowledge corpus.

Next, at 204, IDI program 107 identifies one or more influencing factors which may cause a local deformation of the received 3D rendering of the object, and forecasts which portion(s) of the 3D rendering of the object are likely to be affected by the local deformation. According to at least one embodiment, IDI program 107 may base influencing factor identification and forecast of local deformation on analysis of the attribute information of the 3D rendering received at 202. For instance, continuing with the above machine part example, for each specified usage parameter of the received attribute information which may cause one or more local deformations (e.g., changes in shape/dimension) of the 3D rendering of the machine part, such as for example pressure, temperature or humidity, IDI program 107 may evaluate its effect on the specified physical properties of the received attribute information, such as for example material composition of the machine part and its properties. Materials such as plastics, metals, ceramics etc. may have different expansion coefficients (or other properties) which may cause local deformation of one or more portions of the machine part when subjected to a particular environmental factor. For example, steel has a lower expansion coefficient than aluminum so that when a part having a steel material composition is subjected to a temperature increase, it will deform less than a part having an aluminum material composition.

Furthermore, according to at least one embodiment, in identifying one or more influencing factors which may cause a local deformation of the received 3D rendering of the object (e.g., 3D rendering of machine part) and forecasting which portion(s) of the received 3D rendering of the object are likely to be affected by the local deformation, IDI program 107 may additionally utilize historical learning which may include information of various deformed 3D objects having attribute information similar to the received 3D rendering of the object. Such historical learning content may be stored within the deformation and materials knowledge corpus and accessed by IDI program 107. Moreover, data relating to identification of one or more influencing factors which may cause a local deformation of a 3D rendering of an object currently under evaluation (e.g., the machine part), and forecast of which portion(s) of the 3D rendering are likely to be affected by the local deformation may be added to the deformation and materials knowledge corpus to further knowledge corpus creation and historical learning of IDI program 107.

At 206, IDI program 107 utilizes a GAN to create a new 3D rendering of the object showing the forecasted local deformation (hereinafter referred to as the local deformation rendering) identified at 204. For example, based on identified changes in shape and/or dimension (i.e., the forecasted local deformation) of one or more portions of the received 3D rendering of the machine part, IDI program 107 may use a 3D GAN to generate a new 3D rendering of the machine part which shows a modified shape of the machine part resulting from the forecasted local deformation. IDI program 107 may also reference historical data within the deformation and materials knowledge corpus when generating, via the 3D GAN, the new 3D rendering of the machine part showing the modified shape. IDI program 107 may, via the 3D GAN, create the new 3D rendering of the machine part by first deconstructing the received 3D rendering of the machine part showing the original shape into smaller portions (e.g., sub-components), and then perform an iterative mapping of these smaller portions via GAN loss function to learn how the modeled smaller portions will affect overall shape of the received 3D rendering. The mapping may identify those smaller portion(s) that are experiencing the forecasted local deformation. Additionally, based on a selection of material composition attribute with which to generate the new 3D rendering of the machine part showing the modified shape, IDI program 107 may evaluate material properties (e.g., expansion coefficient, etc.), in order to identify how much total deformation can be created within the new 3D rendering showing the modified shape resulting from the forecasted local deformation.

Next, at 208, IDI program 107 identifies induced deformation of one or more other portions of the received 3D rendering of the object which is predicted to result from the forecasted local deformation. Also, at 208, IDI program 107 utilizes the GAN to create a new 3D rendering of the object showing the identified induced deformation (hereinafter referred to as the induced deformation rendering). For example, based on the forecasted local deformation of one or more portions of the received 3D rendering of the machine part, IDI program 107 may use the 3D GAN to generate an induced deformation rendering of the machine part which shows predicted induced deformation of one or more other portions (different from the portion(s) affected by the forecasted local deformation) of the received 3D rendering of the machine part resulting from the forecasted local deformation. In generating the induced deformation rendering, IDI program 107 may analyze the GAN-generated 3D rendering of the machine part showing the forecasted local deformation (created at 206) and use it as input to derive the induced deformation rendering of the machine part. For instance, IDI program 107 may derive induced deformation by integrating a standard deviation of the forecasted local deformation over the surface of the received 3D rendering of the machine part. Induced deformation may be expected to have a specific distribution as well. Further, information within the deformation and materials knowledge corpus may be used to train IDI program 107 for inferring the distribution of induced deformation. IDI program 107 may further use the 3D rendering created at 206 as input to generate a map of influencing factors contributing to the induced deformation. This map may be used to determine how the received 3D rendering of the object will overall deform when subjected to a particular influencing factor.

According to at least one embodiment, in identifying induced deformation of one or more other portions of the received 3D rendering of the object which is predicted to result from the forecasted local deformation, IDI program 107 may additionally utilize historical learning which may include information of induced deformation of various 3D objects having attribute information similar to the received 3D rendering of the object and similar local deformation. Such historical learning content may be stored within the deformation and materials knowledge corpus and accessed by IDI program 107. Moreover, data relating to identification of induced deformation of a 3D rendering of an object currently under evaluation (e.g., the machine part) may be added to the deformation and materials knowledge corpus to further knowledge corpus creation and historical learning of IDI program 107.

According to at least one other embodiment, in addition to identifying induced deformation of one or more other portions of the received 3D rendering of the object which is predicted to result from the forecasted local deformation, IDI program 107 may also identify induced deformation of portions of received 3D renderings of one or more other objects adjoining the object. For example, identified induced deformation of the machine part may result in induced deformation of one or more other machine parts which adjoin the machine part in a larger assembly.

At 210, IDI program 107 performs compare processing of the received 3D rendering of the object showing the original shape, the generated local deformation rendering of the object, and the generated induced deformation rendering of the object. According to at least one embodiment, the compare processing may include presenting the aforementioned renderings within a graphical user interface (GUI) of IDI program 107. Each rendering may be labeled accordingly within the GUI, or color-coded within the GUI, so that a user may readily distinguish and select between them. Moreover, received attribute information and identified influencing factors may also be presented within the GUI for selection/interaction by the user. Furthermore, presentation of the received 3D rendering of the object showing the original shape, the generated local deformation rendering of the object, and the generated induced deformation rendering of the object may include overlaying the labeled and/or color-coded renderings over each other so that differences between the original shape, the local deformation shape, and the induced deformation shape of the object may be compared and identified. For instance, the presented overlay of renderings may identify and depict a degree to which one or more area(s) of the received 3D rendering of the object showing the original shape may be impacted because of changes in one or more portions of the 3D rendering.

Also, at 210, IDI program 107 recommends design and/or material composition selection of the 3D object based on output of the compare processing. As mentioned above, the received 3D rendering of the object showing the original shape, the generated local deformation rendering of the object, the generated induced deformation rendering of the object, the received attribute information, and the identified influencing factors may be presented within the GUI for selection/interaction by the user. As such, IDI program 107 may, via the GUI, show a predicted deformation in response to a selected influencing factor on a selected 3D rendering. IDI program 107 may further provide a recommendation engine to suggest which influencing factor might cause a maximum deformation on the 3D object. This information may be used to prevent or mitigate further deformation of the 3D object or provide an early warning to the user about the influencing factor causing the maximum deformation. Additionally, IDI program 107 may validate a design and/or material composition selection for the 3D object, or it may recommend alteration of a design or material composition selection so that overall 3D object deformation may be altered (e.g., recommendation of a strong material to mitigate local or induced deformation, recommendation of a soft material to promote desired deformation). Further, IDI program 107 may model for comparison, via overlay of a new 3D rendering of the object, the effect of a change in material composition or design on one or more portions of local and/or induced deformation for one or more influencing factors. Moreover, as IDI program 107 may display any changes in relative positions of portions of the 3D object due to induced deformation, it may also suggest whether the 3D object needs to be restored or replaced, or if deformation is expected or desired. This information may be useful in deciding restoration efforts required to restore the original shape and appearance of the 3D object.

In conclusion of the machine part example above, at 210, IDI program 107 may present an overlay of the received 3D rendering of the machine part showing the original shape, the generated local deformation rendering of the machine part, and the generated induced deformation rendering of the machine part within a GUI. Further, IDI program 107 may recommend a material composition selection to mitigate local and/or induced deformation of the machine part based on compare processing of the presented renderings.

According to at least one other embodiment, IDI program 107 may generate multiple 3D renderings of an object with differing material composition attributes. These multiple 3D renderings of varying material compositions may be 3D-printed and their real-world usage patterns compared, by IDI program 107, over an interval of time in order to further its machine learning and future GAN utilization. For example, the utilization of a real-world part may be made twice and then compared for critical contrast over a temporal period. These known or found deltas within the data processing may be evaluated to further train the GAN model. More specifically, elementary usage will show a certain level of wear and tear pertaining to the health of the part. Further deformation may be inferred by the GAN to show future deformation acceleration, and that can be inferred based upon the material(s) type. Mapping the deformation delta between the parts can aid within a deformation amelioration iterative process for future materials selection of new parts.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    receiving a first, unaltered, three-dimensional (3D) rendering of an object and attribute information of the object;
    identifying one or more influencing factors of forecasted local deformation of one or more portions of the first 3D rendering based on the attribute information, wherein the one or more influencing factors comprise environmental conditions and forces affecting the object;
    creating, via a generative adversarial network (GAN), a second 3D rendering of the object showing the forecasted local deformation resulting from the one or more influencing factors;
    identifying induced deformation of one or more other portions of the first 3D rendering caused by the forecasted local deformation; and
    creating, via the GAN, a third 3D rendering of the object showing the identified induced deformation, wherein the second 3D rendering is used as an input to the GAN to create the third 3D rendering.

2. The method of claim 1, wherein the attribute information comprises information of physical properties of the object and information of usage parameters of the object.

3. The method of claim 1, wherein the identifying one or more influencing factors of forecasted local deformation of one or more portions of the first 3D rendering is also based on a reference to a knowledge corpus containing information of various deformed 3D objects having attribute information similar to the received first 3D rendering of the object.

4. The method of claim 3, wherein the identifying induced deformation of one or more other portions of the first 3D rendering caused by the forecasted local deformation is based on reference to the knowledge corpus which also contains information of induced deformation of various 3D objects having attribute information similar to the received first 3D rendering of the object and similar forecasted local deformation.

5. The method of claim 1, further comprising:
    performing compare processing of the received first 3D rendering of the object, the created second 3D rendering of the object showing the forecasted local deformation, and the created third 3D rendering of the object showing the identified induced deformation; and
    recommending a design or a material composition selection for the object.

6. The method of claim 5, wherein the compare processing comprises presentation of the received first 3D rendering of the object, the created second 3D rendering of the object showing the forecasted local deformation, the created third 3D rendering of the object showing the identified induced deformation, and the attribute information within a graphical user interface (GUI) for selection and interaction by a user, and wherein the recommending comprises a recommendation of a design or a material composition selection which mitigates deformation of the object or promotes a desired deformation of the object.

7. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving a first, unaltered, three-dimensional (3D) rendering of an object and attribute information of the object;
    identifying one or more influencing factors of forecasted local deformation of one or more portions of the first 3D rendering based on the attribute information, wherein the one or more influencing factors comprise environmental conditions and forces affecting the object;

creating, via a generative adversarial network (GAN), a second 3D rendering of the object showing the forecasted local deformation resulting from the one or more influencing factors;

identifying induced deformation of one or more other portions of the first 3D rendering caused by the forecasted local deformation; and creating, via the GAN, a third 3D rendering of the object showing the identified induced deformation, wherein the second 3D rendering is used as an input to the GAN to create the third 3D rendering.

8. The computer system of claim 7, wherein the attribute information comprises information of physical properties of the object and information of usage parameters of the object.

9. The computer system of claim 7, wherein the identifying one or more influencing factors of forecasted local deformation of one or more portions of the first 3D rendering is also based on a reference to a knowledge corpus containing information of various deformed 3D objects having attribute information similar to the received first 3D rendering of the object.

10. The computer system of claim 9, wherein the identifying induced deformation of one or more other portions of the first 3D rendering caused by the forecasted local deformation is based on reference to the knowledge corpus which also contains information of induced deformation of various 3D objects having attribute information similar to the received first 3D rendering of the object and similar forecasted local deformation.

11. The computer system of claim 7, further comprising:
performing compare processing of the received first 3D rendering of the object, the created second 3D rendering of the object showing the forecasted local deformation, and the created third 3D rendering of the object showing the identified induced deformation; and
recommending a design or a material composition selection for the object.

12. The computer system of claim 11, wherein the compare processing comprises presentation of the received first 3D rendering of the object, the created second 3D rendering of the object showing the forecasted local deformation, the created third 3D rendering of the object showing the identified induced deformation, and the attribute information within a graphical user interface (GUI) for selection and interaction by a user, and wherein the recommending comprises a recommendation of a design or a material composition selection which mitigates deformation of the object or promotes a desired deformation of the object.

13. A computer program product, the computer program product comprising:
one or more computer-readable tangible storage medium and program instructions stored on at least one of the one or more tangible storage medium, the program instructions executable by a processor capable of performing a method, the method comprising:
receiving a first, unaltered, three-dimensional (3D) rendering of an object and attribute information of the object;

identifying one or more influencing factors of forecasted local deformation of one or more portions of the first 3D rendering based on the attribute information, wherein the one or more influencing factors comprise environmental conditions and forces affecting the object;

creating, via a generative adversarial network (GAN), a second 3D rendering of the object showing the forecasted local deformation resulting from the one or more influencing factors;

identifying induced deformation of one or more other portions of the first 3D rendering caused by the forecasted local deformation; and creating, via the GAN, a third 3D rendering of the object showing the identified induced deformation, wherein the second 3D rendering is used as an input to the GAN to create the third 3D rendering.

14. The computer program product of claim 13, wherein the attribute information comprises information of physical properties of the object and information of usage parameters of the object.

15. The computer program product of claim 13, wherein the identifying one or more influencing factors of forecasted local deformation of one or more portions of the first 3D rendering is also based on a reference to a knowledge corpus containing information of various deformed 3D objects having attribute information similar to the received first 3D rendering of the object.

16. The computer program product of claim 15, wherein the identifying induced deformation of one or more other portions of the first 3D rendering caused by the forecasted local deformation is based on reference to the knowledge corpus which also contains information of induced deformation of various 3D objects having attribute information similar to the received first 3D rendering of the object and similar forecasted local deformation.

17. The computer program product of claim 13, further comprising:
performing compare processing of the received first 3D rendering of the object, the created second 3D rendering of the object showing the forecasted local deformation, and the created third 3D rendering of the object showing the identified induced deformation; and
recommending a design or a material composition selection for the object.

18. The computer program product of claim 17, wherein the compare processing comprises presentation of the received first 3D rendering of the object, the created second 3D rendering of the object showing the forecasted local deformation, the created third 3D rendering of the object showing the identified induced deformation, and the attribute information within a graphical user interface (GUI) for selection and interaction by a user, and wherein the recommending comprises a recommendation of a design or a material composition selection which mitigates deformation of the object or promotes a desired deformation of the object.

* * * * *